United States Patent

Harris, Sr. et al.

[15] 3,707,239

[45] Dec. 26, 1972

[54] ADAPTER UNIT, SEPTUM INLET DEVICES AND VALVES

[72] Inventors: Rano J. Harris, Sr.; Rano J. Harris, Jr., both of Baton Rouge, La.

[73] Assignee: Precision Sampling Corporation

[22] Filed: July 2, 1971

[21] Appl. No.: 159,170

Related U.S. Application Data

[63] Continuation-in-part of Ser. No. 90,603, Nov. 18, 1970, and a continuation-in-part of Ser. No. 879,232, Nov. 24, 1969, Pat. No. 3,603,471, and a continuation-in-part of Ser. No. 115,496, Feb. 16, 1971.

[52] U.S. Cl..................215/38 R, 215/40, 215/74
[51] Int. Cl. ..............................................B64d 41/02
[58] Field of Search............215/38 R, 40, 74, 47, 39

[56] References Cited

UNITED STATES PATENTS 3,343,699   9/1967   Nicko.................................215/38 R
3,653,528   4/1972   Wimmer............................215/38 R

*Primary Examiner*—George T. Hall
*Attorney*—Llewellyn A. Proctor

[57] ABSTRACT

An adapter unit suitable for fitting upon the wall which forms the top portion of the neck of a container or bottle, and the combination of such unit with a septum inlet device or valve. The adapter unit comprises an internally threaded tubular member, with a flanged end containing a peripherally located O-ring, which flanged end of the said tubular member rests atop the neck of a bottle and can be retained in such position by use of a metal sealing ring. In one embodiment, a septum inlet device is provided by location of a septum within the said tubular member, and it can be retained therein by a second tubular member, externally threaded for engagement with the said adapter tubular member. In another embodiment, a valve assembly is located within the adapter unit.

10 Claims, 5 Drawing Figures

PATENTED DEC 26 1972 3,707,239
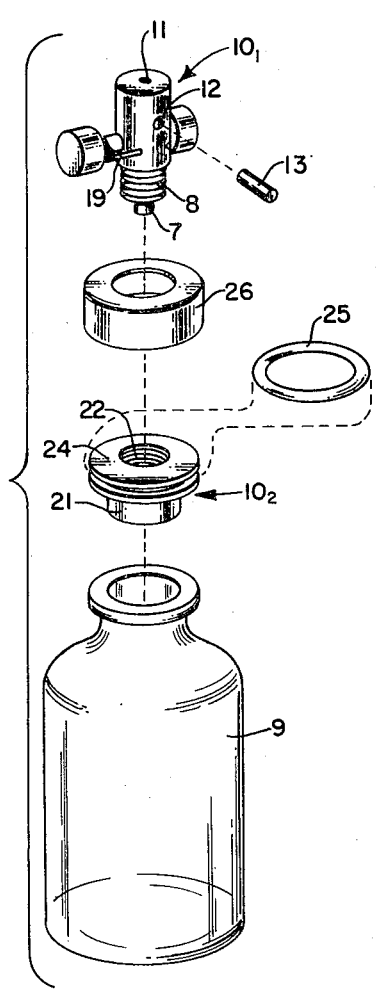
FIG. 1.
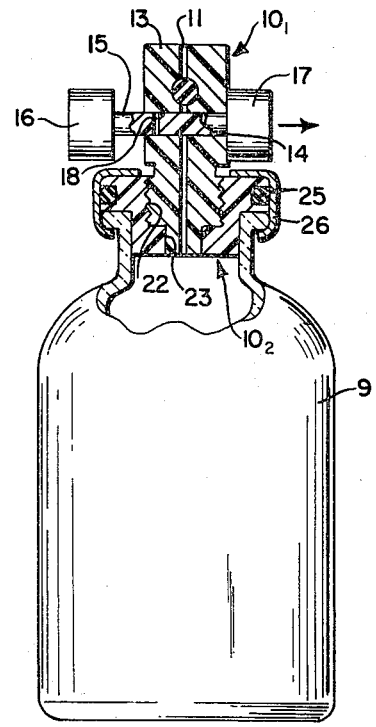
FIG. 2.
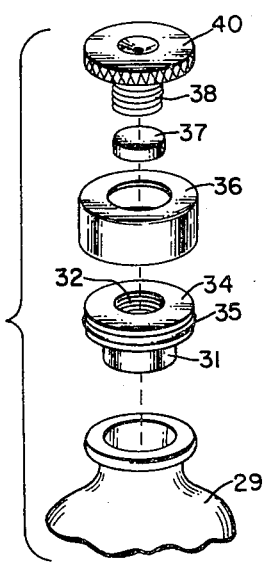
FIG. 3.
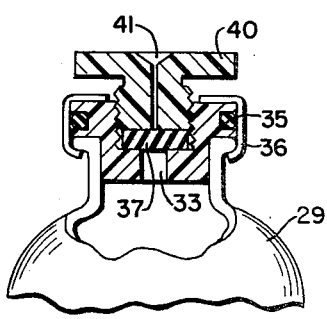
FIG. 4.
FIG. 5.
INVENTORS
RANO J. HARRIS, SR.
RANO J. HARRIS, JR.
BY Llewellyn A. Proctor
ATTORNEY 3,707,239

ADAPTER UNIT, SEPTUM INLET DEVICES AND VALVES

This is a continuation-in-part of application Ser. No. 90,603 filed Nov. 18, 1970, application Ser. No. 879,232 filed Nov. 24, 1969 now U.S. Pat. No. 3,603,471, and application Ser. No. 115,496 filed Feb. 16, 1971, covering various types of septum valves, all the disclosures of which are herein and hereby referred to and fully incorporated by way of reference.

This invention relates to improvements in septum inlet devices and valves, principally, but not exclusively, for use in combination with containers, or apparatus for containing fluids, i.e., liquids or gases, or both, within an enclosed space or volume. The septum inlet devices or valves, in preferred combinations, are used in connection with various types of containers, especially bottles, and fluids are generally removed therefrom by the use of needle syringes. In the several combinations, in accordance with the present invention, the septum inlets or valves are comprised of two principal portions, each being operatively engagable one to the other (or detachable one from the other), preferably by threadable connections. One portion of the assembly, a septum or valve adapter unit, is normally provided with a plug portion or projection for fitting within the neck of a container, and it is held in place by a metal sealing ring or cap which can be positioned over the circumferential or peripheral edges of the wall, or flange, forming the neck of the container. The other portion of the assembly contains a septum, or a valve stem and septum in series. In either case, the septum is self resealable after puncture and withdrawal of a cannula or needle. Fluids can thus be conveniently confined within a container, provided with such septum inlet or valve, until such time as it is desired to inject or withdraw fluid, as when a contained fluid is withdrawn for injection into the inlet system of a modern analytical instrument, e.g., a gas chromatograph or mass spectrometer.

Among the objects of this invention are:

To provide valves of such character which make it feasible to confine even highly volatile fluid compositions, and mixtures, without adverse effect or change caused by external environment.

To provide valves of such character which can be used repeatedly despite adverse external environmental conditions, or changes in such conditions, for injection or withdrawal of fluids, and fluid composition will remain virtually unchanged.

To provide valves of such character which contain septums of resealable character, or character wherein a puncture made by the needle of a syringe will close upon the needle and prevent loss of fluid contents, as the needle enters or is withdrawn from the septum.

To provide septum inlet devices which contain septums of resealable character, as above described.

To provide septum inlet devices and valves of simple structure which can be made by ordinary shop methods, with precision and accuracy, to provide useful articles of commerce.

To provide septum inlet devices, valves, and valve combinations, of the character described which can be tightly affixed and sealed upon containers for direct various usages, and modifications.

These and other objects are achieved in accordance with the present invention which, in all embodiments, includes an adapter unit and also an adapter unit in combination with a septum inlet device or valve. The adapter unit comprises a tubular member adapted for sealable engagement with the neck of a container, and a metal sealing ring is used to secure the said tubular member upon the neck of a container, or bottle. Preferably, at least the upper portion of the internal wall of the said tubular member is threaded and the axial opening through the tubular member is constituted of adjoining contiguous axial openings of different diameters, a large diameter opening being located above a smaller diameter opening, such that an annular surface is provided at the bottom of the tubular member. A disc-shaped septum located thereon can be held in place by a second tubular member, threadably engaged to the adapter unit via threadable engagement with the wall of the relatively large diameter opening to provide a septum inlet of unique character.

In another preferred combination a valve is fitted into the adapter unit, preferably by threadable engagement therewith. The valve is structured such that it includes a tubular body, or tubular member, which contains a septum and stem integrally mounted in series. The stem, provided with a lateral opening therethrough, is slidably or rotatably mounted within the wall of the tubular member to provide a means for exposure of the septum to permit passage of a cannula or needle portion of a syringe for injection or withdrawal of fluid from the bottle. The valve, but for the presence of the septum, is opened and closed by alignment and misalignment of the lateral opening of the stem with the axial opening through the tubular member to expose the septum to penetration. In the case of the septum inlet device or valve, the septum is self-resealable after puncture and withdrawal of a cannula or needle.

This invention, and its principle of operation, will be more fully understood by reference to the following detailed description of specific and preferred embodiments, and to the attached drawings to which reference is made in the description. In the description, where a subscript is used with a number, the latter is to be taken in generic sense, the subscripts being used to indicate that the unit referred to is constituted of more than one component.

In the drawings:

FIG. 1 is a perspective view, depicted in exploded fashion, of a most preferred type of septum valve embodying the present invention, as it would be associated in relation with a typical container, viz., a bottle.

FIG. 2 depicts in partial cross-section the valve of the preceding figure, in assembled form and in combination with the said container.

FIG. 3 is a perspective view, depicted in exploded fashion, of a preferred form of septum inlet device, as it would be associated in relation with a typical container, shown in part.

FIG. 4 depicts the septum inlet device of FIG. 3 in assembled relationship with the container, and in cross-section.

FIG. 5 depicts another preferred form of septum inlet device which is quite useful in medical applications.

Referring to FIGS. 1 and 2 there is shown generally a valve 10, constituted of an upper tubular portion $10_1$ and a lower tubular portion $10_2$. The upper tubular portion $10_1$ of the valve 10 is provided with a central or axial opening 11, and a lateral opening 12 which intersects therewith. A cylindrical shaped septum 13 can be contained within the opening 12, this member lying across and sealing the passageway formed by axial opening 11. A second lateral opening 14 provides a passageway within which a reciprocable stem 15, provided with knobs 16,17, can be fitted. In the position of the stem, best shown by reference to FIG. 2, the valve is closed; but by shifting the stem 15 to the right, or in the direction shown by reference to the arrow, the lateral stem opening 18 can be aligned with the axial opening 11 so that the valve is opened. In such position the cannula of a needle syringe (not shown) can be passed downwardly through the entry portion of the vertically aligned axial opening 11, through the septum 13, through lateral stem opening 18, again through the lower portion of axial opening 11 and then into the bottle 9 so that fluid contents thereof can be withdrawn into the syringe. Upon withdrawal of the cannula the puncture made thereby closes back up, or is self-resealed. This assures minimum exposure of the bottle contents to the ambient atmosphere. The valve 10 can then be closed by sliding the stem 15 in the opposite direction. It will be noted that the vertical orientation of the stem opening 18 can be assured by use of a pin 19. The pin 19 is permanently mounted on knob 16 and is permanently extended into and reciprocable within a third lateral opening (not numbered) within the tubular body $10_1$ so that any rotation of the stem is prevented. It is, of course, apparent that a rotatable stem such as described in application Ser. No. 879,232, supra, is the equivalent of the push-pull type stem described herein, such structure being incorporated herein by way of reference.

The lower portion $10_2$ of the valve 10, as described in FIGS. 1 and 2, in combination with the metal sealing cap or ring 26 comprises an adapter unit for fitting a valve portion, such as described above, upon the opening of a container. The portion $10_2$ of the valve 10 is thus constituted of a tubular member 21, through the center of which is provided openings 22,23 of two different diameters. Threads are cut into the internal wall which forms the larger diameter upper opening 22, these threads being of size and pitch for threadable engagement with the threaded projected portion 8 of the upper portion $10_2$ of the valve 10. The smaller diameter opening 23 is sized for receipt of the nib 7 located on the lowermost portion of valve portion $10_2$. The upper portion of tubular member 21 is flanged, and the flange 24 is provided with a circumferential notch or slot within which O-ring 25 can be fitted. In position upon the top of the neck of bottle 9, the smaller diameter portion thereof is pushed downwardly into the neck of bottle 9 and the flange 24 rests atop the shoulder which forms the bottle neck. The metal sealing cap or ring 26, which is provided with a top wall provided with a central opening, and a side wall, is pulled downwardly over the flange 24 and the lower edges of the side wall thereof is crimped or turned inwardly to grasp the underneath side of the shoulder which forms the bottle neck. The pressure exerted forces or extrudes the O-ring outwardly into contact with the inside face of the metal sealing ring, and a very effective leakproof seal is formed. Sound mechanical stability of the structure is also assured by use of the metal sealing ring 26 in the combination described.

A septum inlet device is also described by reference to FIGS. 3 and 4. In this instance the adapter unit of the septum inlet is identical in principle and operation to that described by reference to the preceding figures. The adapter unit is thus also comprised of a flanged tubular member 31 which is held in place upon the top of a neck of a bottle 29 by a metal sealing ring 36. The tubular member 31 is provided with contiguous vertically oriented openings 32,33. The wall of the larger diameter opening 32 is threaded, while the wall of the smaller diameter opening 33 is smooth. The flange 34 is provided with a circumferential notch, within which can be located O-ring 35. The metal sealing ring 36 can be pulled down over the flanged portion of the tubular member 31, after the small diameter portion thereof has been inserted into the neck of the bottle 29, to form an effective leakproof seal and the lower edges of the metal ring 36 can be turned inwardly or crimped to hold the tubular member 31 securely in place upon the neck of the bottle 29.

A septum 37, of disc-like shape, can be rested upon the annular surface or shoulders formed at the junction of the contiguous openings 32,33 and the plug 40 can be fitted downwardly thereupon to form an effective leakproof seal. The lower projecting portion 38 of plug 40 is preferably externally threaded for threadable engagement with the internally threaded wall portion of opening 32, and thus by screwing this member 40 downwardly upon the septum 37 a seal is formed. The cannula of a needle syringe (not shown) can be passed downwardly through the vertically oriented axial opening 41 of the plug 40, the septum 37 penetrated and the cannula then passed into the bottle 29 through opening 33. Fluid can then be withdrawn from the bottle 29 through the cannula. Upon withdrawal of the cannula the puncture made by the cannula in septum 37 closes back up or automatically reseals to protect the contents of the bottle 29 from exposure to external conditions.

Referring to FIG. 5 there is shown a further, but quite important, refinement of the septum inlet device defined by reference to preceding FIGS. 3 and 4. This septum inlet device differs from the latter in that two vertically oriented parallelly aligned openings are provided within a plug 50, rather than a single axial opening as in the device described with reference to the preceding figures.

There is thus shown in FIG. 5 a flanged tubular member 51, the smaller diameter portion of which is fitted into a bottle 59. A metal sealing ring 56 is drawn downwardly over the flanged portion of the member and the lower edges thereof turned inwardly to grasp the lowermost shoulders of the neck of bottle 59. The pressure exerted thereby forces the O-ring 55 to extrude or bulge outwardly into contact with the inner surface of the metal sealing ring 56 to form an effective leakproof seal. The wall of the larger diameter opening 52 is threaded for threadable engagement with the externally threaded portion 58 of plug 50, and the wall surface of the contiguous smaller diameter opening 53 of tubular member 51 is smooth. The disc-shaped septum 57 rests upon and is pressed down tightly against the annular shoulders formed at the junction of the openings 52,53.

In a preferred use for this type of septum inlet device, a vent line (not shown) can be housed within one of the vertically oriented axial openings 61 of the plug 50. A needle could thus be projected through the said opening 61, septum 57, opening 53 and to a location near the bottom of bottle 59. A needle, to which is attached a delivery conduit, could be similarly passed through opening 62, septum 57, opening 53 and to a location near the top of the bottle 59. By inversion of the bottle 59 liquid could therefore be delivered through the needle contained in opening 62, and air displaced into the bottle 59 via the needle inserted through opening 61 to assure continuous uninterrupted delivery of liquid from the bottle 59 to the exterior source. Such technique is common in medicinal applications.

It is apparent that various modifications can be made without departing the spirit and scope of the invention. Changes in size, shape, or in the absolute and relative dimension of the parts, materials used and the like, as well as in the precise method of withdrawing or delivering fluids will thus be apparent to those skilled in this art.

Desirably, the valve and the septum inlet devices are formed of a rigid or semi-rigid type of plastic or plasticlike material. The self-lubricated plastics, polymers or copolymers, are especially preferred in this capacity, notable among which is the tetrafluoroethylene polymer, sold under the tradename "Teflon." Illustrative of other materials are Nylon, Dacron and the like. These materials can also be applied as the outer surface of laminor constructions, applied upon inner rigid materials.

The sealing ring is generally constructed of a relatively soft metal such as aluminum, or an alloy of aluminum, or a plastic material which may be threadably attached to the neck of the bottle, in the manner of a common screw-cap.

The septums are formed of elastomers or elastic materials, illustrative of which are vulcanized natural rubbers and synthetic rubbers such as neoprene, chloroprene, butyl rubber, chlorobutyl rubber, and the like.

Having described the invention, what is claimed is:

1. An adapter unit suitable for fitting upon the wall which forms the top portion of the neck of a bottle comprising, in combination,
    a tubular member formed by an enclosing wall providing an axial opening therethrough, the inside wall of which is threaded and the upper portion thereof is flanged outwardly and provided with a circumferential notch, the flanged portion thereof being adapted for resting upon the top of the bottle neck while the smaller diameter portion of the said tubular member can be thrust into the neck of the bottle,
    an O-ring for fitting within the circumferential notch of the flanged portion of said tubular member,
    a sealing ring with top and side walls, a central opening through the top wall of which coincides with the axial opening through the said tubular member, the lower portion of the side wall of which can be secured to the bottle neck,
    whereby the O-ring is bulged outwardly and thrust against the inside surface of the sealing ring to form an effective leakproof seal upon the top of the bottle.

2. The apparatus of claim 1 wherein a valve is included with the combination, said valve comprising
    a tubular member formed by an enclosing wall providing an axial opening therethrough, said wall being externally threaded and adapted for threadable engagement with the threaded inside wall of the tubular member of the adapter unit, and wherein is provided a pair of lateral openings which intersect with the said axial opening,
    a septum located within a first lateral opening, which lies across, covers and seals the axial opening through the said tubular member,
    a stem movably mounted within the second lateral opening in the wall of said tubular member, which stem can be moved to align the lateral opening of the stem and axial tubular opening to open the valve and thereby expose the septum to penetration as by the cannula of a needle syringe used to withdraw fluid from the bottle, or closed to such exposure for maximum confinement of the fluid contents of the bottle.

3. The apparatus of claim 2 wherein the movable stem used for opening and closing the valve is of a push-pull type.

4. The apparatus of claim 2 wherein the movable stem is rotatable within the lateral opening such as to open and close the valve.

5. The apparatus of claim 2 wherein the tubular members of both the adapter unit and valve are constituted essentially of Teflon.

6. The apparatus of claim 2 wherein the septum located within the tubular member constituting a portion of the valve is located above the movable stem and in series therewith, the lowermost portion of the wall of the said valve tubular member is externally threaded and provided with a projecting nib, and the inside wall of the tubular member constituting a portion of the adapter unit is provided with an opening of diameter corresponding to the external diameter of the threaded valve tubular member and threaded for receipt and threadable engagement with the said valve member, and a smaller diameter opening contiguous to the larger diameter opening of said adapter unit within which the nib of the said valve tubular member is received.

7. The apparatus of claim 1 wherein the axial opening within the tubular member of the adapter unit is constituted of a contiguous pair of openings, an upper larger diameter opening the wall of which is internally threaded, and a lower smaller diameter opening communicated with the said larger diameter opening, said pair of openings forming an annular surface therebetween.

8. The apparatus of claim 7 wherein a disc-shaped septum is located upon the annular surface between the pair of openings, and a tubular member with an externally threaded wall is threadably engaged with the threaded upper larger diameter opening of the tubular member forming the adapter unit.

9. The apparatus of claim 8 wherein the said tubular member engaged with the adapter unit is comprised of Teflon.

10. The apparatus of claim 9 wherein the tubular member adjoined with the adapter unit is provided with a plurality of vertically oriented parallelly aligned axial openings.

* * * * *